US012719107B2

(12) United States Patent
Wang et al.

(10) Patent No.: US 12,719,107 B2
(45) Date of Patent: Aug. 25, 2026

(54) BATTERY AND ELECTRIC DEVICE

(71) Applicant: CONTEMPORARY AMPEREX TECHNOLOGY (HONG KONG) LIMITED, Hong Kong (CN)

(72) Inventors: Wei Wang, Ningde (CN); Jiarong Hong, Ningde (CN); Yuepan Hou, Ningde (CN); Mu Qian, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 743 days.

(21) Appl. No.: 18/126,503

(22) Filed: Mar. 27, 2023

(65) Prior Publication Data

US 2023/0231224 A1 Jul. 20, 2023

Related U.S. Application Data

(63) Continuation of application No. PCT/CN2022/076043, filed on Feb. 11, 2022.

(30) Foreign Application Priority Data

Apr. 1, 2021 (CN) ........................ 202110357856.4

(51) Int. Cl.
*H01M 10/6556* (2014.01)
*H01M 10/48* (2006.01)
(Continued)

(52) U.S. Cl.
CPC ..... *H01M 10/6556* (2015.04); *H01M 10/486* (2013.01); *H01M 10/615* (2015.04);
(Continued)

(58) Field of Classification Search
CPC ........... H01M 10/6556; H01M 10/486; H01M 10/615; H01M 10/63; H01M 10/6554;
(Continued)

(56) References Cited

U.S. PATENT DOCUMENTS

2013/0059180 A1 3/2013 Yang et al.
2013/0143093 A1 6/2013 Teng et al.
(Continued)

FOREIGN PATENT DOCUMENTS

CN 1851895 A 10/2006
CN 103066342 A 4/2013
(Continued)

OTHER PUBLICATIONS

Notice of Submission of Opinions issued Mar. 6, 2025 in Korean Patent Application No. 10-2022-7035684 with Machine English translation.

(Continued)

*Primary Examiner* — Lisa S Park
(74) *Attorney, Agent, or Firm* — XSENSUS LLP

(57) ABSTRACT

A battery may include a first battery module, a second battery module, and a thermal management component. The first battery module may include a plurality of first battery cells, the second battery module may include a plurality of second battery cells, and the plurality of second battery cells may be located at the peripheries of the first battery cells. The thermal management component may include a first flow channel, a second flow channel, a first inlet through which fluid is input into the first flow channel, and a second inlet through which fluid is input into the second flow channel. The first flow channel and the second flow channel can be formed as two separate flow channels for flowing, so that the first flow channel adjusts temperature of the plurality (Continued)

of first battery cells and the second flow channel adjusts temperature of the plurality of second battery cells.

19 Claims, 9 Drawing Sheets

(51) Int. Cl.
*H01M 10/615* (2014.01)
*H01M 10/63* (2014.01)
*H01M 10/6554* (2014.01)
*H01M 50/204* (2021.01)

(52) U.S. Cl.
CPC ....... *H01M 10/63* (2015.04); *H01M 10/6554* (2015.04); *H01M 50/204* (2021.01)

(58) Field of Classification Search
CPC ............. H01M 50/204; H01M 10/653; H01M 10/482; H01M 10/613; H01M 10/6568; H01M 10/617; H01M 10/6567; Y02E 60/10
See application file for complete search history.

(56) References Cited

U.S. PATENT DOCUMENTS

| | | | | |
|---|---|---|---|---|
| 2016/0285144 | A1* | 9/2016 | Song | H01M 10/63 |
| 2017/0125861 | A1* | 5/2017 | Machida | H01M 10/613 |
| 2020/0161729 | A1 | 5/2020 | Kim et al. | |

FOREIGN PATENT DOCUMENTS

| | | | |
|---|---|---|---|
| CN | 105882349 | A | 8/2016 |
| CN | 106004337 | A | 10/2016 |
| CN | 109830625 | A | 5/2019 |
| CN | 110411261 | * | 11/2019 |
| CN | 110710052 | A | 1/2020 |
| CN | 210006865 | * | 1/2020 |
| CN | 111432596 | A | 7/2020 |
| CN | 112151910 | A | 12/2020 |
| CN | 212209611 | U | 12/2020 |
| CN | 212848578 | U | 3/2021 |
| FR | 3100608 | A | 3/2021 |
| JP | 2015082353 | * | 4/2015 |
| JP | 2020-149818 | A | 9/2020 |
| JP | 2021-051839 | A | 4/2021 |
| KR | 10-2016-0113902 | A | 10/2016 |
| KR | 101688483 | B1 | 12/2016 |
| KR | 10-2018-0133729 | A | 12/2018 |

OTHER PUBLICATIONS

International Search Report and Written Opinion mailed on May 9, 2022, in corresponding PCT/CN2022/076043, 11 pages.
Office Action issued on Apr. 20, 2023, in corresponding Chinese patent Application No. 202110357856.4, 15 pages.
Office Action issued on Jun. 15, 2023, in corresponding Chinese patent Application No. 202110357856.4, 11 pages.
Notice of Allowance issue on Aug. 14, 2023, in corresponding Chinese patent Application No. 202110357856.4, pages.
Office Action issued Nov. 14, 2023 in Japanese Patent Application No. 2022-558483 with English translation thereof.

* cited by examiner

BATTERY AND ELECTRIC DEVICE

CROSS-REFERENCE TO RELATED APPLICATION

This application is a continuation of International Application No. PCT/CN2022/076043, filed Feb. 11, 2022, which claims priority to the Chinese Patent Application No. 202110357856.4, filed on Apr. 1, 2021 and entitled "BATTERY AND ELECTRONIC DEVICE", each of which is incorporated herein by reference in its entirety.

TECHNICAL FIELD

This application relates to the field of battery power technologies, and in particular, to a battery and an electric device.

BACKGROUND

With the development of new energy technologies, energy density of batteries is getting higher and higher, and the application range of batteries is becoming wider and wider. Batteries are extremely sensitive to temperature. When the temperature is excessively low or excessively high, charging and discharging capacity of the batteries is reduced and service life of the batteries is shortened. In order to control the temperature of a battery, a thermal management assembly is usually provided to cool down or heat up the battery. This is to ensure that the battery operates within a predetermined temperature range, avoiding excessively high or excessively low battery temperatures.

SUMMARY

In order to solve the above-mentioned technical problems, embodiments of the present disclosure provide a battery and an electric device, which can separately manage temperature of battery cells in different areas.

The following technical solutions are adopted for the embodiments of the present disclosure to solve the technical problems.

A battery is provided, including a first battery module, a second battery module, and a thermal management component. The first battery module includes a plurality of first battery cells, the second battery module includes a plurality of second battery cells, and the plurality of second battery cells are located at the peripheries of the first battery cells. The thermal management component includes a first flow channel and a second flow channel, the first flow channel being configured to accommodate fluid to adjust temperature of the plurality of first battery cells, and the second flow channel being configured to accommodate fluid to adjust temperature of the plurality of second battery cells. The thermal management component further includes a first inlet and a second inlet, the first inlet being configured for inputting fluid into the first flow channel and the second inlet being configured for inputting fluid into the second flow channel, with the first inlet and the second inlet isolated from each other.

In some embodiments, the thermal management component further includes a first outlet and a second outlet, the first outlet being configured for outputting fluid in the first flow channel and the second outlet being configured for outputting fluid in the second flow channel, where the first outlet and the second outlet communicate with each other.

In some embodiments, the first flow channel and the second flow channel are isolated from each other.

In some embodiments, the battery further includes a first inlet pipeline and a second inlet pipeline, where the first inlet pipeline is configured to be connected to the first inlet to input fluid into the first flow channel; and the second inlet pipeline is configured to be connected to the second inlet to input fluid into the second flow channel.

In some embodiments, the battery further includes a first switch and a second switch. The first switch is disposed on the first inlet pipeline and configured to control connection and disconnection between the first inlet pipeline and the first flow channel. The second switch is disposed on the second inlet pipeline and configured to control connection and disconnection between the second inlet pipeline and the second flow channel.

In some embodiments, the battery further includes a first temperature sensor, a second temperature sensor, and a controller. The first temperature sensor is configured to sense temperature of at least one of the first battery cells, and the second temperature sensor is configured to sense temperature of at least one of the second battery cells. The controller is configured to be electrically connected to the first temperature sensor, the second temperature sensor, the first switch, and the second switch, and the controller is configured to control on-off of the first switch and the second switch based on temperatures sensed by the first temperature sensor and the second temperature sensor respectively.

In some embodiments, the thermal management component includes a beat exchange plate, the heat exchange plate being configured to perform heat exchange with the first battery module and the second battery module, and the heat exchange plate being provided with the first flow channel and the second flow channel inside.

In some embodiments, the heat exchange plate includes an upper heat exchange plate and a lower heat exchange plate, where the upper heat exchange plate is configured to perform heat exchange with the first battery module and the second battery module; and the lower heat exchange plate is disposed on a side of the upper heat exchange plate away from the first battery module and the second battery module. The first flow channel and the second flow channel are formed between the upper heat exchange plate and the lower heat exchange plate, so that fluid flows therein.

In some embodiments, the heat exchange plate is connected to the first battery module via a thermally conductive structural adhesive; and/or the heat exchange plate is connected to the second battery module via a thermally conductive structural adhesive.

In some embodiments, the first flow channel is disposed in a bent shape; and/or the second flow channel is disposed in a U shape.

According to a second aspect, an electric device is provided, including the battery according to any one of the foregoing embodiments, the battery being configured to supply electric energy.

Compared with the prior art, the battery provided in some embodiments of the present disclosure includes a plurality of first battery cells and a plurality of second battery cells disposed at the peripheries of the first battery cells. The thermal management component includes a first flow channel, a second flow channel, a first inlet through which fluid is input into the first flow channel, and a second inlet through which fluid is input into the second flow channel. The first flow channel and the second flow channel can be formed as two separate flow channels for flowing, so that the first flow channel adjusts temperature of the plurality of first battery cells and the second flow channel adjusts temperature of the plurality of second battery cells, implementing temperature control of the battery cells in different areas, thereby avoiding excessive temperature differences between the battery cells and improving energy utilization of a thermal management system.

DESCRIPTION OF DRAWINGS

One or more embodiments are used as examples for description by using corresponding accompanying drawings. These example descriptions impose no limitation on the embodiments. Elements with a same reference sign in the accompanying drawings represent similar elements. Unless otherwise specified, the figures in the accompanying drawings impose no limitation on a scale.

Figure 1:
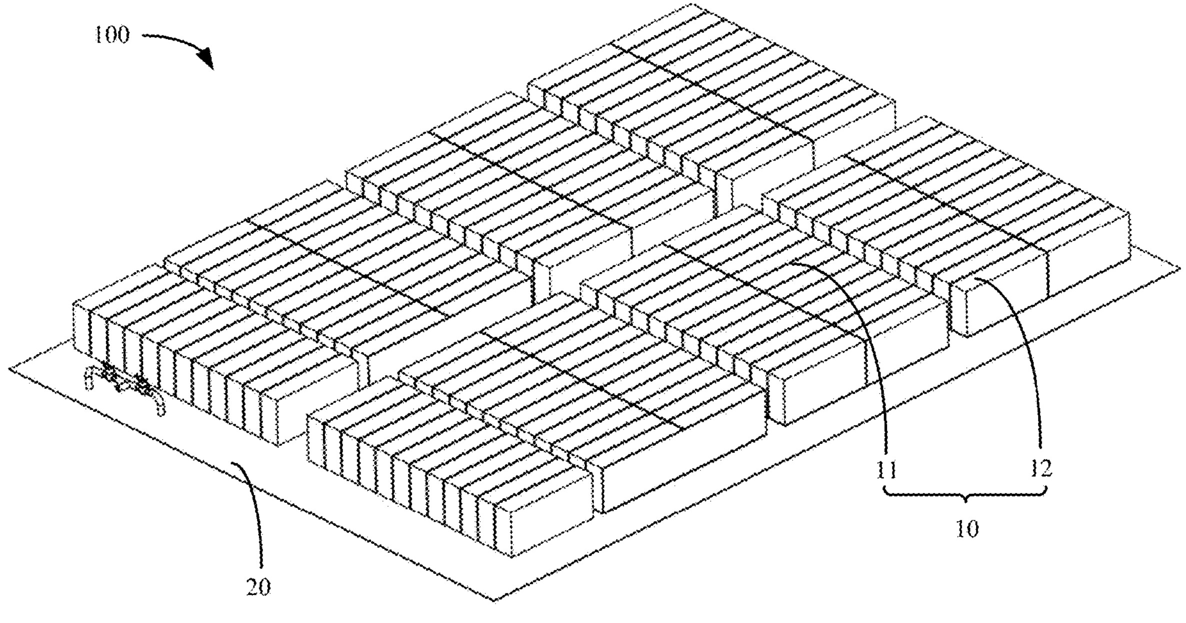
FIG. 1 is a schematic structural diagram of a battery according to an embodiment of the present disclosure.

The accompanying drawings are not drawn to scale.

Reference signs are as follows:

- 100. battery
  - 10. battery module
    - 11. first battery module
      - 110. first battery cell
    - 12. second battery module
      - 120. second battery cell
  - 20. thermal management component
    - 201. first flow channel
    - 202. second flow channel
    - 203. first inlet
    - 204. second inlet
    - 205. first outlet
    - 206. second outlet
    - 21. heat exchange plate
      - 210. upper heat exchange plate
      - 212. lower heat exchange plate
      - 201*a*. first groove
      - 202*a*. second groove
    - 220. first inlet pipeline
    - 222. second inlet pipeline
    - 224. main inlet pipeline
    - 230. first switch
    - 232. second switch
    - 240. first temperature sensor
    - 242. second temperature sensor
    - 25. controller
  - 30. housing
    - 31. box body
    - 32. cover.

DETAILED DESCRIPTION OF THE DISCLOSURE

For ease of understanding the present disclosure, the following further describes the present disclosure in detail with reference to the accompanying drawings and specific embodiments. It should be noted that, when a component is referred to as being "fixed to" another component, it may be directly fixed to the another component or there may be one or more components therebetween. When a component is referred to as being "connected to" another component, it may be directly connected to the another component or there may be one or more components therebetween. The terms "perpendicular", "horizontal", "left", right", "inside", "outside" and similar expressions used in this specification are merely for description purposes.

Unless otherwise defined, all technical and scientific terms used herein have the same meanings as commonly understood by those skilled in the art to which this application belongs. The terms used in the specification of the present disclosure are merely intended to describe specific embodiments but not to constitute any limitation on the present disclosure. The term "and/or" used herein includes any and all combinations of one or more of associated items that are listed.

In addition, technical features involved in different embodiments of the present disclosure that are described below may be combined as long as they do not conflict with each other.

During implementation of the present disclosure, the inventors of the present disclosure have found that: when a battery works, affected by arrangement of battery cells, battery cells close to an edge area commonly have low temperature. In addition, as heat of the battery is transferred from the center to the edge of the battery, battery cells in a middle area dissipate heat slowly due to heat accumulation. Therefore, large temperature differences are formed between the battery cells in the edge area and the battery cells in the middle area. As a result, it is necessary to perform temperature management on battery cells in different areas to guarantee performance of the battery.

Referring to FIG. 1, an embodiment of the present disclosure provides a battery 100, including a battery module 10 and a thermal management component or structure 20. The battery module 10 is disposed on the thermal management component 20, and the thermal management component 20 is configured to adjust temperature of the battery module 10. Adjusting temperature herein may refer to raising or lowering the temperature.

Figure 2:
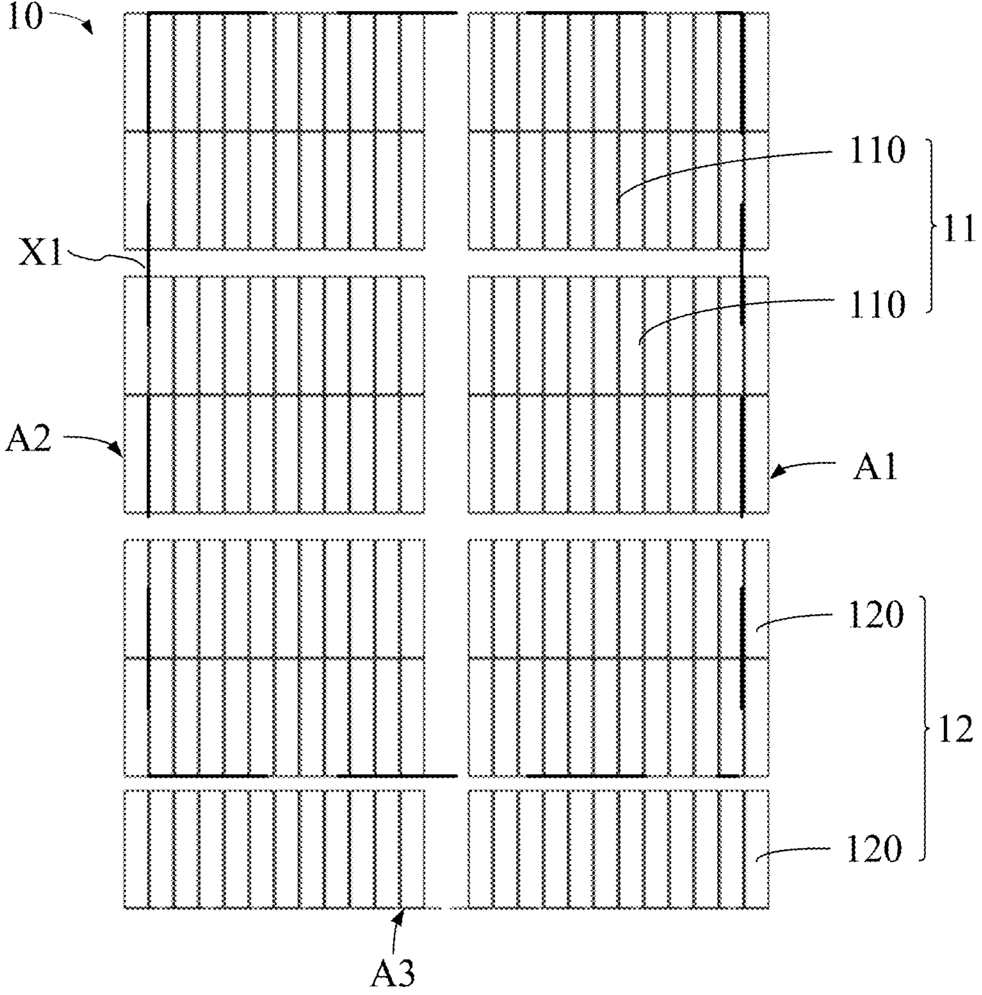
FIG. 2 is a schematic structural diagram of a battery module of the battery shown in FIG. 1.

Referring to FIG. 1 and FIG. 2, the battery module 10 includes a first battery module 11 and a second battery module 12. The first battery module 11 includes a plurality of first battery cells 110, where the plurality of first battery cells 110 are sequentially stacked and arranged. The second battery module 12 includes a plurality of second battery cells 120, where the plurality of second battery cells 120 are disposed at the peripheries of the first battery cells 110. During operation of the battery 100, a temperature of the first battery cells 110 is higher than that of the second battery cells 120.

The plurality of second battery cells 120 include at least one row of battery cells located at a first lateral edge A1 of the battery module 10, at least one row of battery cells located at a second lateral edge A2 of the battery module 10, and at least one column of battery cells located at a third lateral edge A3 of the battery module 10. The plurality of second battery cells 120 are arranged in a U shape. The first lateral edge A1 and the second lateral edge A2 are two opposite edges. As shown in FIG. 2, the first battery module 11 and the second battery module 12 are separated by a dotted box X1 for example description. The first battery module 11 includes the plurality of first battery cells 110 located inside the dotted box X1, and the second battery module 12 includes the plurality of second battery cells 120 located outside the dotted box X1.

Figure 3:
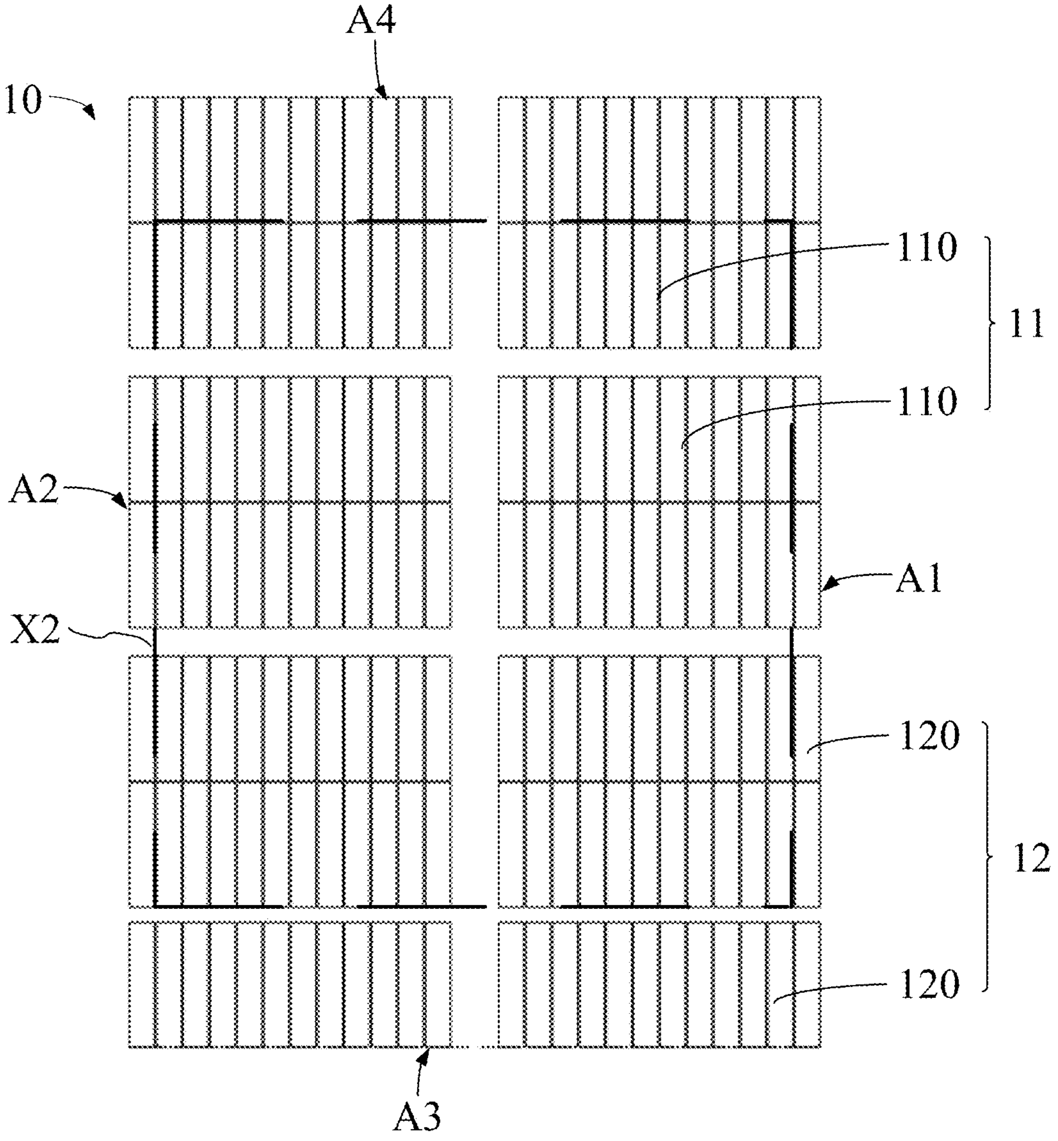
FIG. 3 is a schematic structural diagram of a battery module of a battery according to an embodiment of the present disclosure.

Referring to FIG. 3, in some other embodiments, the plurality of second battery cells 120 may further include at least one column of battery cells located at a fourth lateral edge A4 of the battery module 10, and the plurality of second battery cells 120 are arranged in a "square" shape. The fourth lateral edge A4 and the third lateral edge A3 are two opposite edges. As shown in FIG. 3, the first battery module 11 and the second battery module 12 are separated by a dotted box X2 for example description. The first battery module 11 includes the plurality of first battery cells 110 located inside the dotted box X2, and the second battery module 12 includes the plurality of second battery cells 120 located outside the dotted box X2.

In some other embodiments, the plurality of second battery cells may include only at least one row of battery cells located at the first lateral edge of the battery module 10 and at least one row of battery cells located at the second lateral edge of the battery module 10, or battery cells in other low temperature areas, which is not limited herein.

Figure 4:
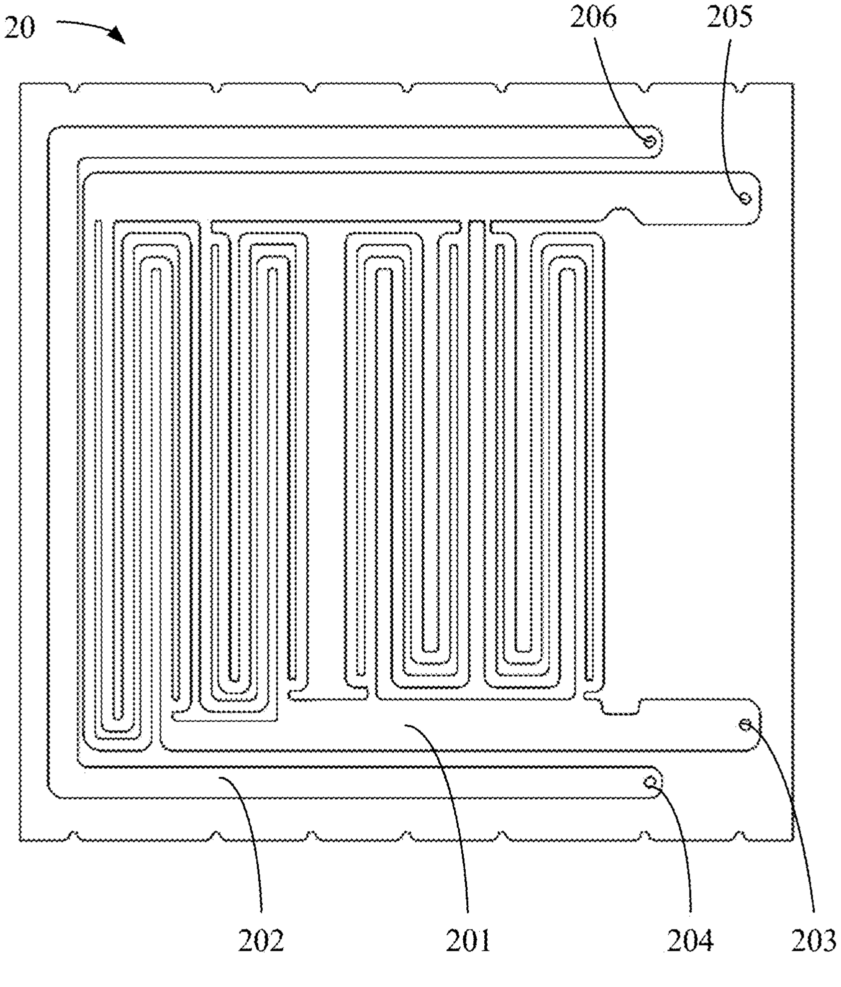
FIG. 4 is a schematic structural diagram of a thermal management component of the battery shown in FIG. 1.

Referring to FIG. 2 and FIG. 4, the thermal management component 20 includes a first flow channel 201 and a second flow channel 202. The first flow channel 201 is disposed in a bent shape, a position of the first flow channel 201 corresponds to a position of the first battery module 11, and the first flow channel 201 is configured to accommodate fluid to adjust temperature of the plurality of first battery cells 110. The second flow channel 202 is disposed in a U shape, the second flow channel 202 is disposed at the periphery of the first flow channel 201, a position of the second flow channel 202 corresponds to a position of the second battery module 12, and the second flow channel 202 is configured to accommodate fluid to adjust temperature of the plurality of second battery cells 120. The fluid accommodated in the first flow channel 201 and the second flow channel 202 may be water, gas, mixed liquid of water and glycol, or the like, and may circulate. It can be understood that, in some other embodiments, the shape of the second flow channel 202 may be set depending on an actual demand, for example, may be set as the "square" shape, the L shape, or the like. The shape of the second flow channel 202 needs to correspond to the shape of the second battery module 12 to meet a requirement for heat exchange of the second battery module 12. Preferably, the second flow channel 202 may cover each of the second battery cells 120 to increase heat exchange efficiency.

The thermal management component 20 further includes a first inlet 203 and a second inlet 204 isolated from each other. The first inlet 203 communicate with one end of the first flow channel 201, and the first inlet 203 is configured for inputting fluid into the first flow channel 201. The second inlet 204 communicate with one end of the second flow channel 202, and the second inlet 204 is configured for inputting fluid into the second flow channel 202.

The thermal management component 20 further includes a first outlet 205 and a second outlet 206. The first outlet 205 communicate with the other end of the first flow channel 201, and fluid may be input into the first flow channel 201 through the first inlet 203 and output from the first outlet 205. The second outlet 206 communicate with the other end of the second flow channel 202, and fluid may be input into the second flow channel 202 through the second inlet 204 and output from the second outlet 206.

Figure 5:
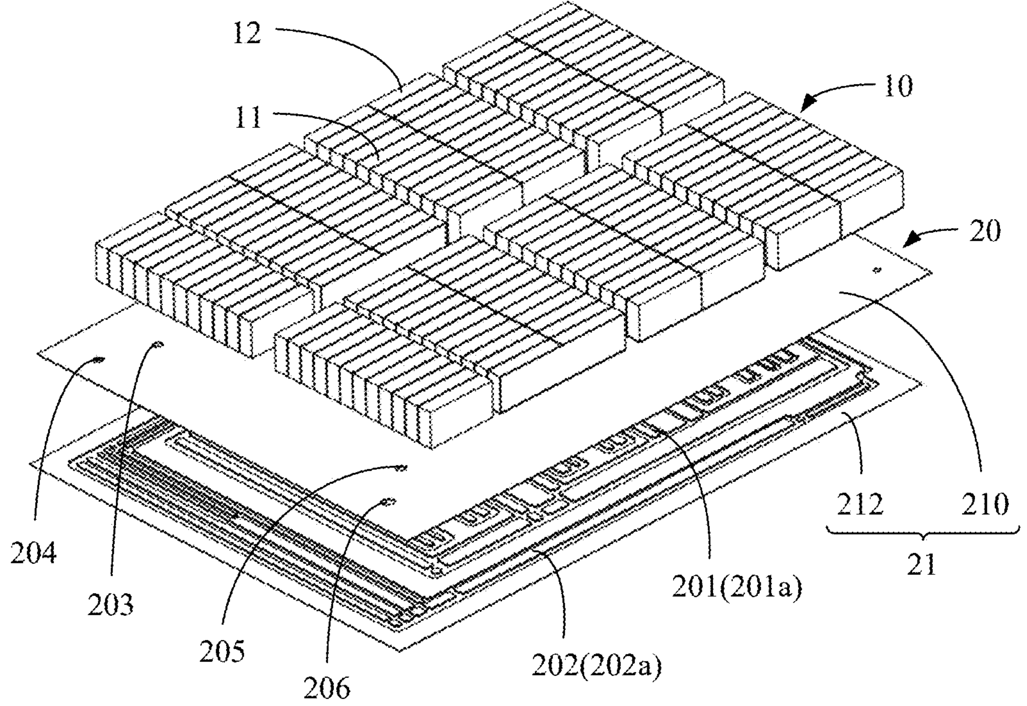
FIG. 5 is a schematic exploded view of the battery shown in FIG. 1.

Referring to FIG. 4 and FIG. 5, the thermal management component 20 includes a heat exchange plate 21, where the first flow channel 201 and the second flow channel 202 are disposed inside the heat exchange plate 21. The battery module 10 is disposed on the heat exchange plate 21, and the heat exchange plate 21 is configured to perform heat exchange with the first battery module 11 and the second battery module 12. The heat exchange plate 21 may be connected to the first battery module 11 or the second battery module 12 through a thermally conductive structural adhesive, so that the heat exchange plate 21 is connected and fixed to the battery module 10. The thermally conductive structural adhesive may fill a gap between the heat exchange plate 21 and the battery module 10, so as to enhance the heat exchange effect of the heat exchange plate 21.

The heat exchange plate 21 includes an upper heat exchange plate 210 and a lower heat exchange plate 212, where one surface of the upper heat exchange plate 210 is connected to the lower heat exchange plate 212 and the other surface of the upper heat exchange plate 210 is connected to the first battery module 11 and the second battery module 12. The first flow channel 201 and the second flow channel 202 are formed between the upper heat exchange plate 210 and the lower heat exchange plate 212. Materials of the upper heat exchange plate 210 and the lower heat exchange plate 212 may be metal aluminum or other aluminum alloy, and the upper heat exchange plate 210 and the lower heat exchange plate 212 may be fastened by means of braze welding or in other welding manners.

The surface of the lower heat exchange plate 212 facing the upper heat exchange plate 210 is provided with a first groove 201*a* and a second groove 202*a*, and the upper heat exchange plate 210 covers the lower heat exchange plate 212 to close the first groove 201*a* and the second groove 202*a* to form the first flow channel 201 and the second flow channel 202. It can be understood that, in some other embodiments, the first groove and the second groove may alternatively be formed in the upper heat exchange plate, the lower heat exchange plate covers the upper heat exchange plate to form the first flow channel and the second flow channel, or the upper heat exchange plate and the lower beat exchange plate each are provided with the first groove and the second groove corresponding in position, and the upper heat exchange plate and the lower heat exchange plate are spliced to form the first flow channel and the second flow channel, which is not limited herein.

The upper heat exchange plate 210 is provided with the first inlet 203 and the second inlet 204, and the first inlet 203 and the second inlet 204 penetrate through the upper heat exchange plate 210. The first inlet 203 communicates the first flow channel 201 with the outside, and the second inlet 204 communicates the second flow channel 202 with the outside.

The upper heat exchange plate 210 is further provided with the first outlet 205 and the second outlet 206, and the first outlet 205 and the second outlet 206 penetrate through the upper heat exchange plate 210. The first outlet 205 communicates the first flow channel 201 with the outside, and the second outlet 206 communicates the second flow channel 202 with the outside. The first outlet 205 and the second outlet 206 do not communicate with each other, so that the first flow channel 201 and the second flow channel 202 are isolated from each other.

Figure 6:
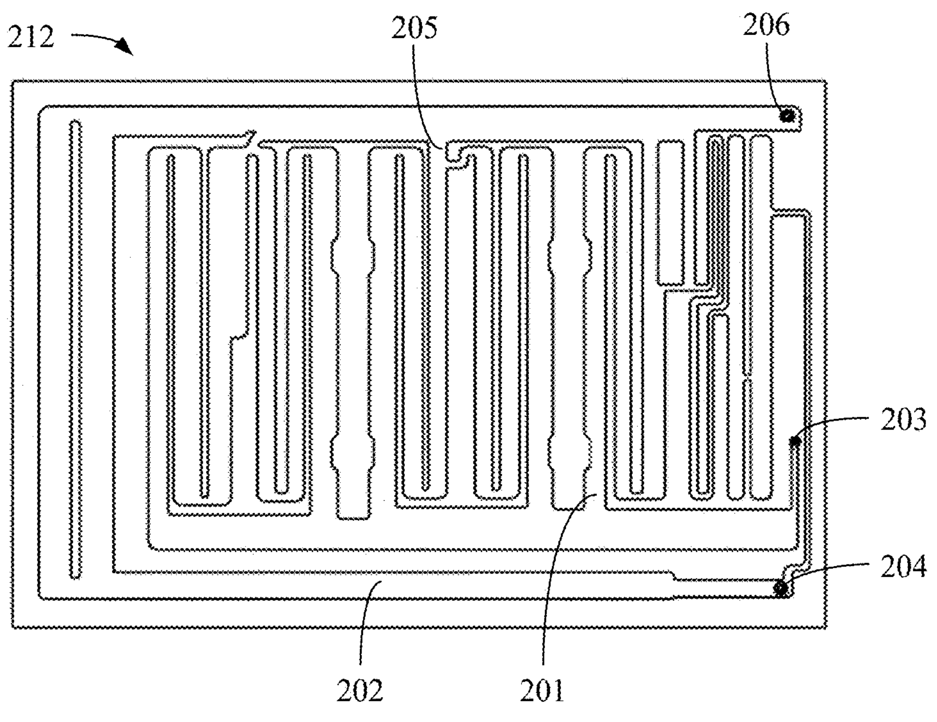
FIG. 6 is a schematic structural diagram of a thermal management component of a battery according to an embodiment of the present disclosure.

Referring to FIG. 6, in some embodiments, the first outlet 205 and the second outlet 206 may alternatively communicate with each other, and fluid in the first flow channel 201 and the second flow channel 202 is discharged through a main outlet. For example, the second outlet 206 may be used as the main outlet, where the first outlet 205 of the first flow channel 201 communicates with the second flow channel 202, and after being input into the first flow channel 201 through the first inlet 203, fluid is input into the second flow channel 202 through the first outlet 205 and then discharged from the second outlet 206; or, the first outlet 205 may be used as the main outlet, where the second outlet 206 of the second flow channel 202 communicates with the first flow channel 201, and after being input into the second flow channel 202 through the second inlet 204, fluid is input into the first flow channel 201 through the second outlet 206 and then discharged from the first outlet 205; or, the first flow channel 201 and the second flow channel 202 both communicate with the main outlet, which is not limited herein.

Figure 7:
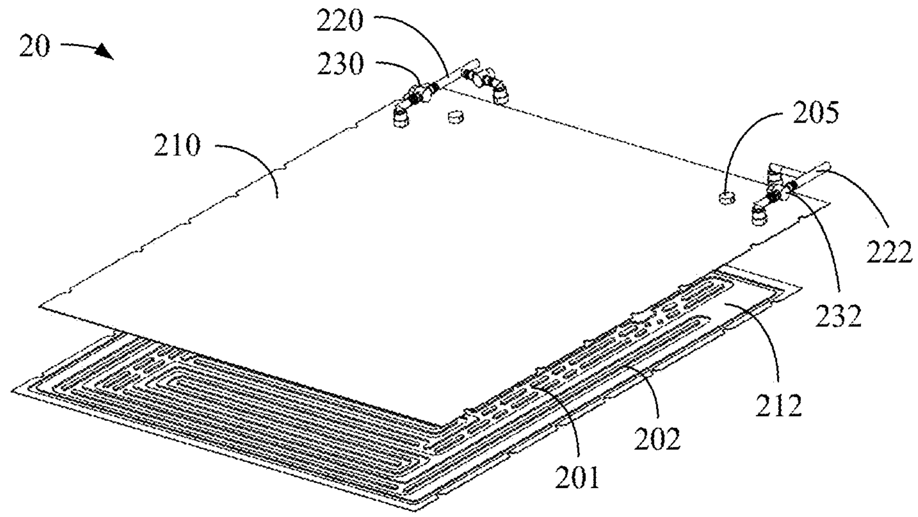
FIG. 7 is a schematic structural diagram of a thermal management component of a battery according to an embodiment of the present disclosure.
Figure 8:
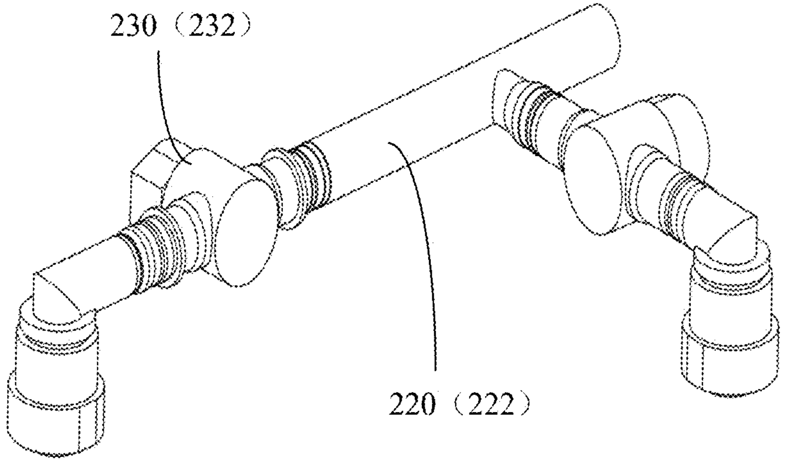
FIG. 8 is a schematic structural diagram of an inlet pipeline and a pipeline switch of the thermal management component shown in FIG. 6.

Referring to FIG. 5, FIG. 7, and FIG. 8, further, the thermal management component 20 further includes an inlet pipeline, where the inlet pipeline is mounted on the upper heat exchange plate 210, and the inlet pipeline includes a first inlet pipeline 220 and a second inlet pipeline 222. An end of the first inlet pipeline 220 is connected to the first inlet 203 to input fluid into the first flow channel 201. The second inlet pipeline 222 is connected to the second inlet 204 to input fluid into the second flow channel 202. The first inlet pipeline 220 and the second inlet pipeline 222 are isolated from each other, the first inlet pipeline 220 and the second inlet pipeline 222 are connected to an external heat exchanger, and the heat exchanger is configured to perform heat exchange for fluid. Materials of the first inlet pipeline 220 and the second inlet pipeline 222 may be metal alloy or nylon, or the like, so as to guarantee sealing properties of the pipelines.

Further, the thermal management component 20 further includes a pipeline switch disposed on the inlet pipeline. The pipeline switch includes a first switch 230 and a second switch 232. The first switch 230 is disposed on the first inlet pipeline 220 and configured to control connection and disconnection between the first inlet pipeline 220 and the first flow channel 201. The second switch 232 is disposed on the second inlet pipeline 222 and configured to control connection and disconnection between the second inlet pipeline 222 and the second flow channel 202. The pipeline switch may use quick connectors disposed between the first inlet pipeline 220 and the first inlet 203 and between the second inlet pipeline 222 and the second inlet 204; or, the pipeline switch may alternatively use control valves disposed between the first inlet pipeline 220 and the heat exchanger and between the second inlet pipeline 222 and the heat exchanger.

Figure 9:
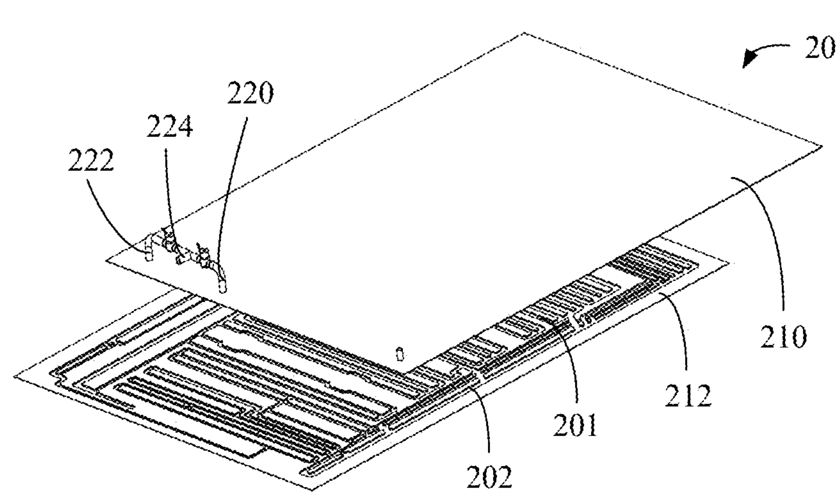
FIG. 9 is a schematic structural diagram of a thermal management component of a battery according to an embodiment of the present disclosure.
Figure 10:
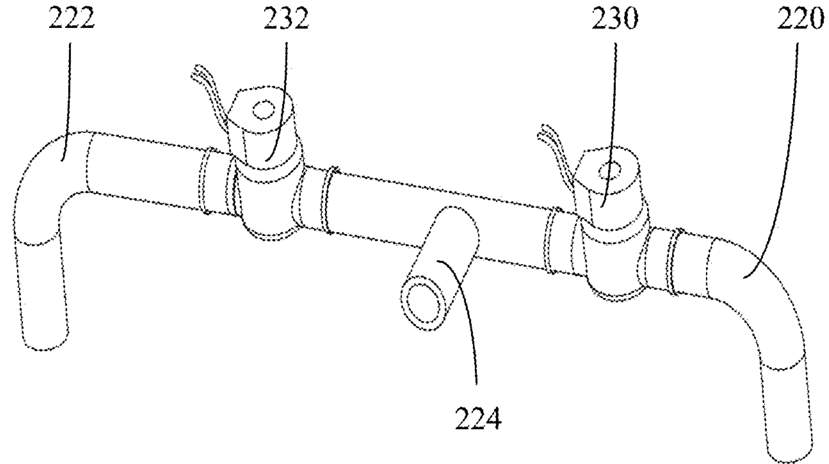
FIG. 10 is a schematic structural diagram of an inlet pipeline and a pipeline switch of the thermal management component shown in FIG. 8.

Referring to FIG. 9 and FIG. 10, in some embodiments, the first inlet pipeline 220 and the second inlet pipeline 222 are connected via a main inlet pipeline 224, the main inlet pipeline 224 is connected to an external heat exchanger, and fluid is input into the first inlet pipeline 220 and the second inlet pipeline 222 through the main inlet pipeline 224. The first switch 230 is disposed between the first inlet pipeline 220 and the main inlet pipeline 224, and the first switch 230 controls connection and disconnection between the first inlet pipeline 220 and the main inlet pipeline 224, so as to control connection and disconnection between the first flow channel 201 and the first inlet pipeline 220. The second switch 232 is disposed between the second inlet pipeline 222 and the main inlet pipeline 224, and the second switch 232 controls connection and disconnection between the second inlet pipeline 222 and the main inlet pipeline 224, so as to control connection and disconnection between the second flow channel 202 and the second inlet pipeline 222.

Figure 11:
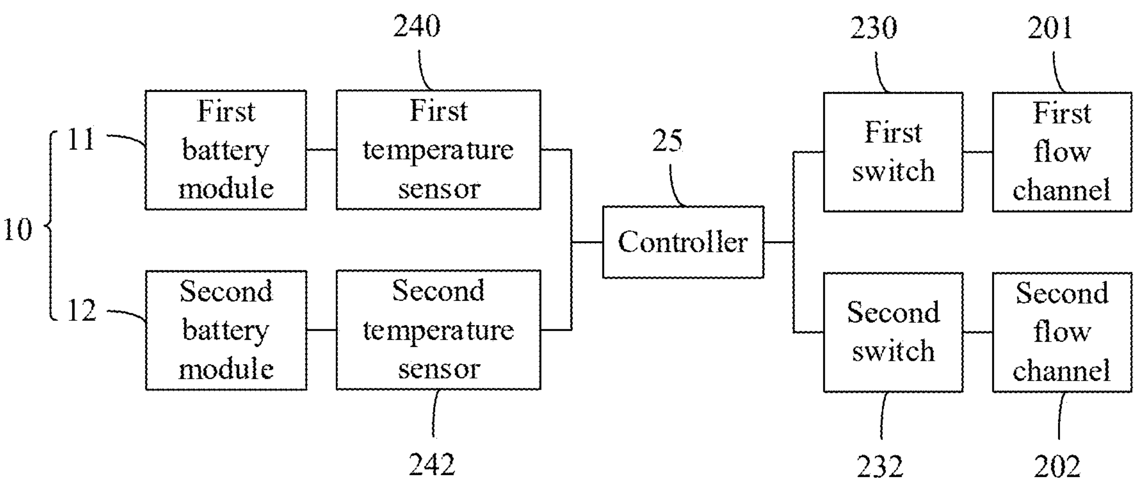
FIG. 11 is a diagram of functional modules of a battery according to an embodiment of the present disclosure.

Referring to FIG. 11, further, the thermal management component 20 further includes a temperature sensor and a controller 25, where the controller 25 is electrically connected to the temperature sensor and the pipeline switch. The temperature sensor is disposed on the battery module 10 and configured to detect a temperature change of the battery module 10 and be communicatively connected to the controller 25. When the temperature sensor detects that a temperature of the first battery module 11 or the second battery module 12 is higher than a preset temperature, the controller 25 controls the heat exchanger to cool down fluid and opens the pipeline switch to input the fluid into the first flow channel 201 or the second flow channel 202, so that the fluid cools down the first battery module 11 or the second battery module 12; and when the temperature sensor detects that the temperature of the first battery module 11 or the second battery module 12 is lower than the preset temperature, the controller 25 controls the heat exchanger to heat up the fluid and opens the pipeline switch to input the fluid into the first flow channel 201 or the second flow channel 202, so that the fluid heats up the first battery module 11 or the second battery module 12. In this way, the thermal management component 20 implements automated temperature management on the battery module 10.

The temperature sensor includes a first temperature sensor 240 and a second temperature sensor 242. The first temperature sensor 240 is disposed on the first battery module 11, the first temperature sensor 240 is connected to at least one of the first battery cells 110, and the first temperature sensor 240 is configured to sense temperature of the at least one of the first battery cells 110. The second temperature sensor 242 is disposed on the second battery module 12, the second temperature sensor 242 is connected to at least one of the second battery cells 120, and the second temperature sensor 242 is configured to sense temperature of the at least one of the second battery cells 120.

The controller 25 is electrically connected to the first temperature sensor 240 and the first switch 230, and the controller 25 controls on-off of the first switch 230 based on a temperature sensed by the first temperature sensor 240. The controller 25 is also electrically connected to the second temperature sensor 242 and the second switch 232, and the controller 25 controls on-off of the second switch 232 based on a temperature sensed by the second temperature sensor 242. It can be understood that in some embodiments, there may be two controllers which are configured to control the first switch 230 and the second switch 232 respectively.

Figure 12:
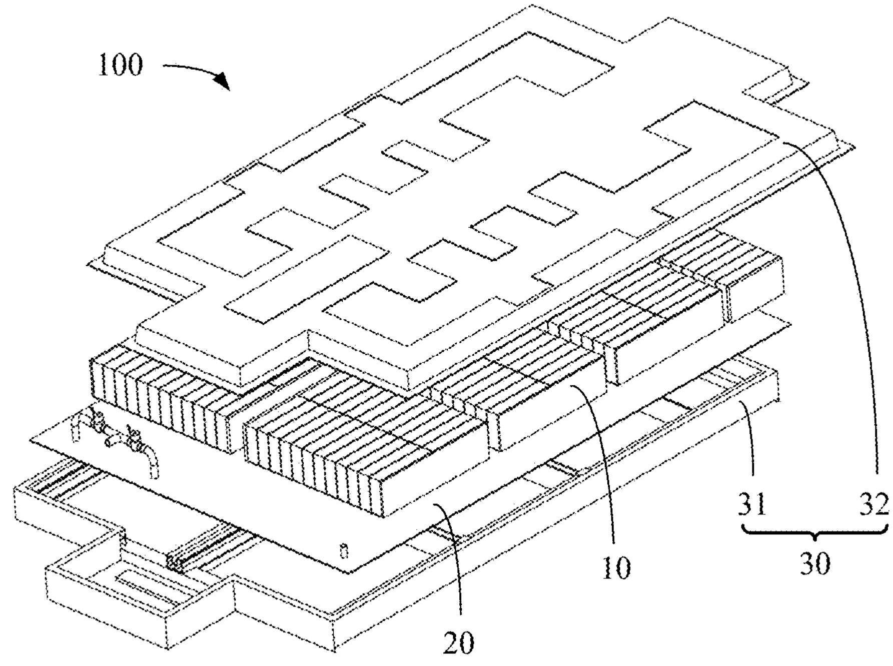
FIG. 12 is a schematic structural diagram of a battery according to an embodiment of the present disclosure.

Referring to FIG. 12, in some embodiments, the battery 100 further includes a housing 30, where the housing 30 is disposed outside the battery module 10 and the thermal management component 20. The housing 30 includes a box body 31 and a cover 32, where the cover 32 is connected to the box body 31. The box body 31 is provided with an accommodation space inside which both the battery module 10 and the thermal management component 20 are disposed, and the cover 32 is disposed on the box body 31 to close the accommodation space. The box body 31 and the cover 32 may also be made of a thermally conductive material to transfer heat of the battery module 10 or the thermal management component 20 to the outside.

Referring to the above-mentioned accompanying drawings, during operation of the battery 100, heat generated by the battery module 10 is transferred to the thermal management component 20. Affected by arrangement of the battery cells, the plurality of first battery cells 110 in a middle area dissipate heat slowly due to heat accumulation, and the plurality of second battery cells 120 in an edge area commonly have a low temperature. When the battery operates at a high temperature, the first flow channel 201 may be opened to cool down the first battery module 11 to reduce temperature differences in the battery, thereby effectively regulating the temperature differences in the battery. When the battery operates at a low temperature, the second flow channel 202 may be opened to heat up the second battery module 12 to increase temperature of the battery cells at an outer edge of the battery, thereby guaranteeing optimum energy utilization. It can be understood that the first flow channel 201 and the second flow channel 202 may alternatively be opened simultaneously to cool down or heat up the first battery module 11 and the second battery module 12, so as to guarantee temperature uniformity of the battery module 10.

Another embodiment of the present disclosure provides an electric device, including the battery 100 according to any one of the foregoing embodiments. The battery 100 is configured to supply electric energy. The electric device may be a device that uses battery such as a vehicle, a ship, an aircraft, an energy storage device and a low handheld electrical tool.

Finally, it should be noted that the foregoing embodiments are merely intended to describe the technical solutions of the present disclosure and are not intended to limit the present disclosure. Under the idea of the present disclosure, the foregoing embodiments or the technical features in different embodiments can also be combined, the steps can be implemented in any order, and there are many other changes in different aspects of the present disclosure as described above, which, for the sake of brevity, are not provided in detail. Although the present disclosure is described in detail with reference to the foregoing embodiments, persons of ordinary skill in the art should understand that modifications can be made to the technical solutions described in the foregoing embodiments, or equivalent substitutions can be made to some technical features therein, and these modifications or substitutions do not make the essence of the corresponding technical solutions depart from the scope of the technical solutions of the embodiments of the present disclosure.

The invention claimed is:

1. A battery, comprising:

a first battery module, comprising a plurality of first battery cells;

a second battery module, comprising a plurality of second battery cells, the plurality of second battery cells being located only at peripheries of the battery; and a thermal management structure, comprising a first flow channel and a second flow channel, the first flow channel being configured to accommodate fluid to adjust a temperature of the plurality of first battery cells and the second flow channel being configured to accommodate fluid to adjust a temperature of the plurality of second battery cells;

wherein the thermal management structure further comprises a first inlet and a second inlet, the first inlet being configured for inputting fluid into the first flow channel and the second inlet being configured for inputting fluid into the second flow channel, with the first inlet and the second inlet isolated from each other, the thermal management structure further comprises a heat exchange plate, the heat exchange plate being configured to perform heat exchange with the first battery module and the second battery module, and the heat exchange plate being provided with the first flow channel and the second flow channel inside.

2. The battery according to claim 1, wherein the thermal management structure further comprises:

a first outlet, configured for outputting fluid in the first flow channel; and a second outlet, configured for outputting fluid in the second flow channel;

wherein the first outlet and the second outlet communicate with each other.

3. The battery according to claim 1, wherein the first flow channel and the second flow channel are isolated from each other.

4. The battery according to claim 1, wherein the second flow channel covers each of the plurality of the second battery cells.

5. The battery according to claim 1, wherein the battery further comprises:

a first inlet pipeline, configured to be connected to the first inlet to input the fluid into the first flow channel; and a second inlet pipeline, configured to be connected to the second inlet to input the fluid into the second flow channel.

6. The battery according to claim 5, wherein the first inlet pipeline and the second inlet pipeline are isolated from each other.

7. The battery according to claim 5, wherein the first inlet pipeline and the second inlet pipeline are connected via a main inlet pipeline, the main inlet pipeline is connected to an external heat exchanger, and the fluid is input into the first inlet pipeline and the second inlet pipeline through the main inlet pipeline.

8. The battery according to claim 5, wherein the battery further comprises:

a first switch, disposed on the first inlet pipeline and configured to control connection and disconnection between the first inlet pipeline and the first flow channel; and a second switch, disposed on the second inlet pipeline and configured to control connection and disconnection between the second inlet pipeline and the second flow channel.

9. The battery according to claim 8, wherein the battery further comprises:

a first temperature sensor, configured to sense the temperature of at least one of the first battery cells;

a second temperature sensor, configured to sense the temperature of at least one of the second battery cells; and a controller, configured to be electrically connected to the first temperature sensor, the second temperature sensor, the first switch, and the second switch, the controller being configured to control on-off of the first switch and the second switch based on temperatures sensed by the first temperature sensor and the second temperature sensor respectively.

10. The battery according to claim 9, wherein under a condition that the first temperature sensor or the second temperature sensor detects that a temperature of the first battery module or the second battery module is higher than a preset temperature, the controller controls a heat exchanger to cool down the fluid and opens the first switch or the second switch to input the fluid into the first flow channel or the second flow channel, so that the fluid cools down the first battery module or the second battery module.

11. The battery according to claim 9, wherein under a condition that the first temperature sensor or the second temperature sensor detects that the temperature of the first battery module or the second battery module is lower than the preset temperature, the controller controls the heat exchanger to heat up the fluid and opens the first switch or the second switch to input the fluid into the first flow channel or the second flow channel, so that the fluid heats up the first battery module or the second battery module.

12. The battery according to claim 1, wherein the heat exchange plate comprises:

an upper heat exchange plate, the upper heat exchange plate being configured to perform heat exchange with the first battery module and the second battery module; and a lower heat exchange plate, the lower heat exchange plate being disposed on a side of the upper heat exchange plate away from the first battery module and the second battery module;

wherein the first flow channel and the second flow channel are formed between the upper heat exchange plate and the lower heat exchange plate, so that fluid flows therein.

13. The battery according to claim 1, wherein the heat exchange plate is connected to the first battery module via a thermally conductive structural adhesive; and/or the heat exchange plate is connected to the second battery module via a thermally conductive structural adhesive.

14. The battery according to claim 12, wherein one surface of the upper heat exchange plate is connected to the lower heat exchange plate and the other surface of the upper heat exchange plate is connected to the first battery module and the second battery module.

15. The battery according to claim 12, wherein a surface of the lower heat exchange plate facing the upper heat exchange plate is provided with a first groove and a second groove, and the upper heat exchange plate covers the lower heat exchange plate to close the first groove and the second groove to form the first flow channel and the second flow channel.

16. The battery according to claim 12, wherein the upper heat exchange plate and the lower heat exchange plate are fastened together by means of welding.

17. The battery according to claim 1, the fluid accommodated in the first flow channel and/or the second flow channel is water, gas, or a mixed liquid of water and glycol.

18. The battery according to claim 1, wherein the first flow channel is disposed in a bent shape; and/or the second flow channel is disposed in a U shape.

19. An electric device, comprising:

the battery according to claim 1, the battery being configured to supply electric energy.

* * * * *